June 28, 1927.
S. CORNETT
1,634,174
DISPLAY SIGN AND METHOD OF PRODUCING THE SAME
Filed April 20, 1926      3 Sheets-Sheet 1
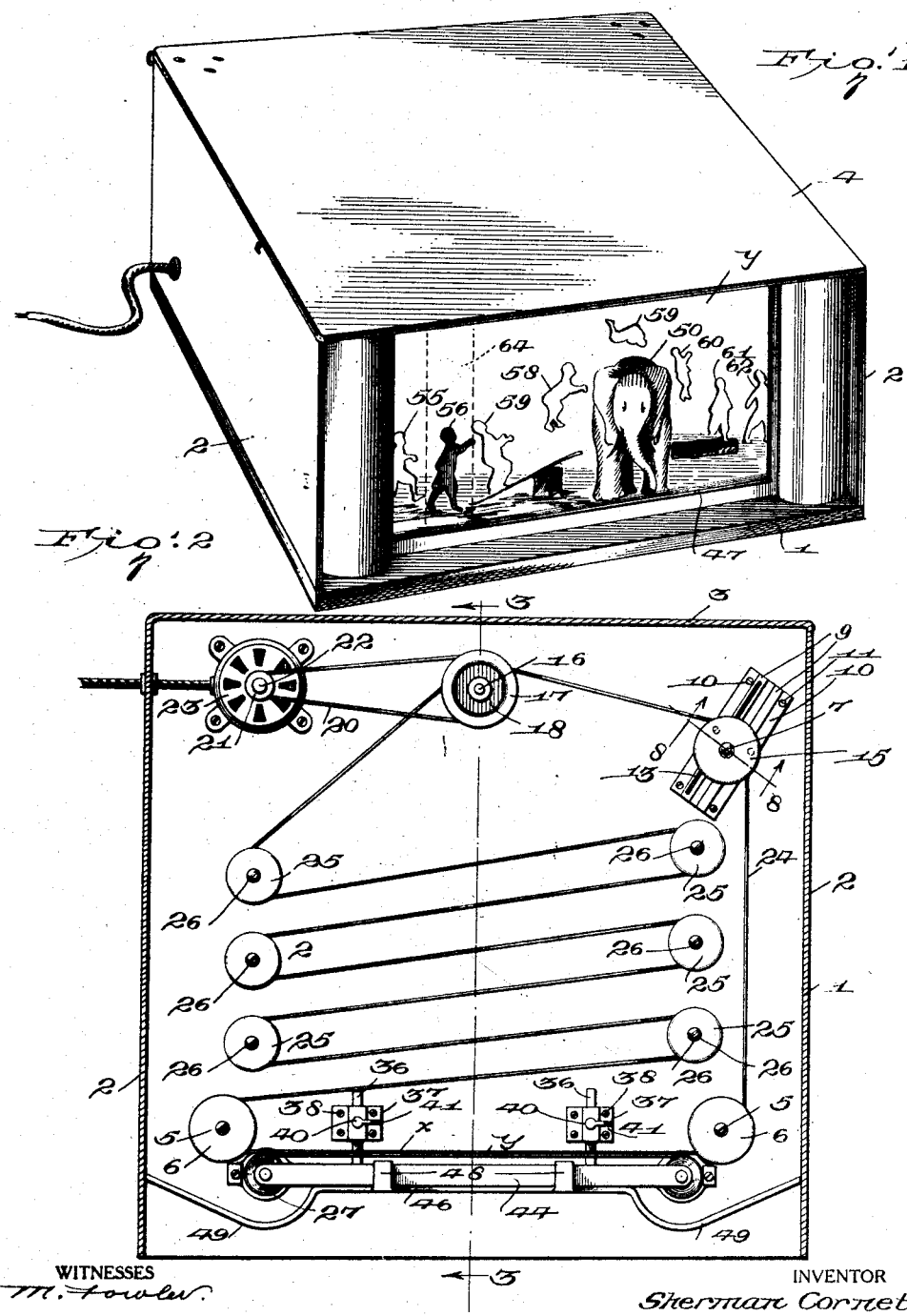
INVENTOR
Sherman Cornett
BY
ATTORNEYS June 28, 1927.
S. CORNETT
1,634,174
DISPLAY SIGN AND METHOD OF PRODUCING THE SAME
Filed April 20, 1926     3 Sheets-Sheet 2
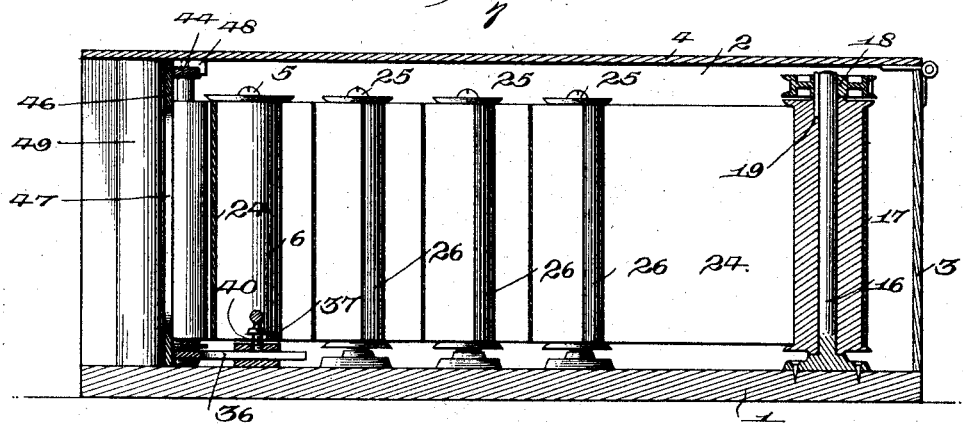
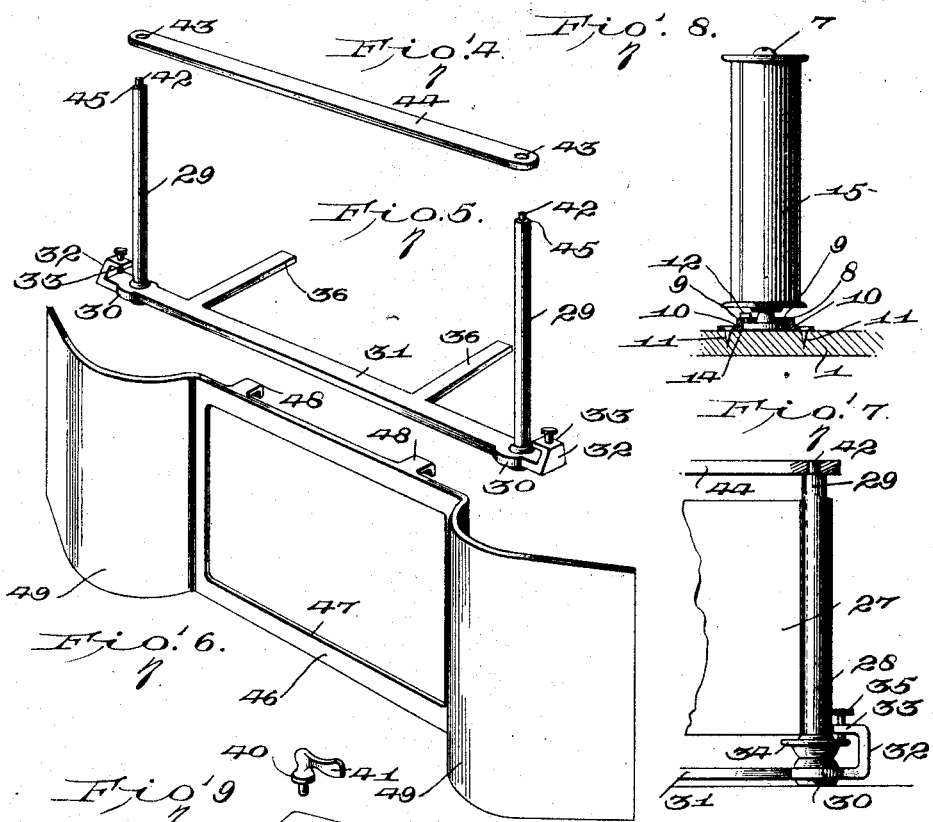
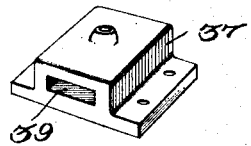
WITNESSES
M. Fowler.
INVENTOR
Sherman Cornett
BY
ATTORNEYS

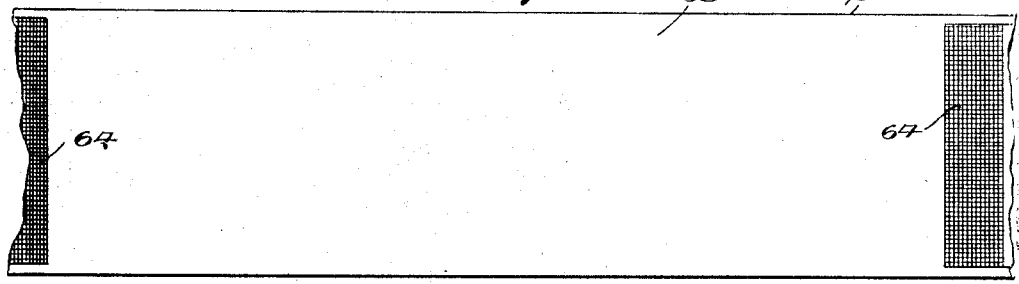
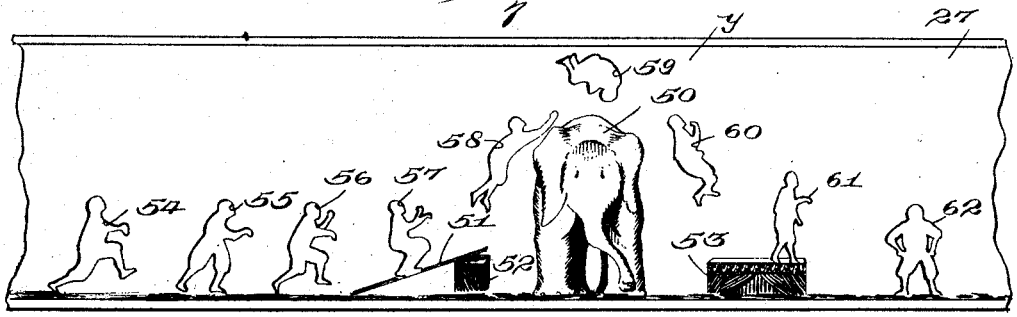
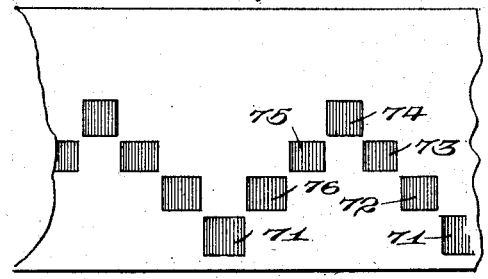
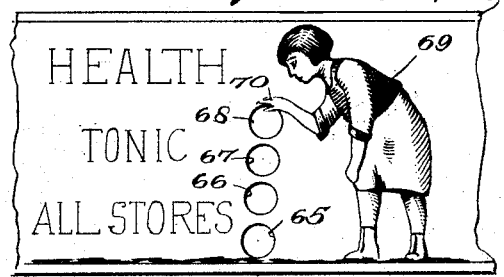
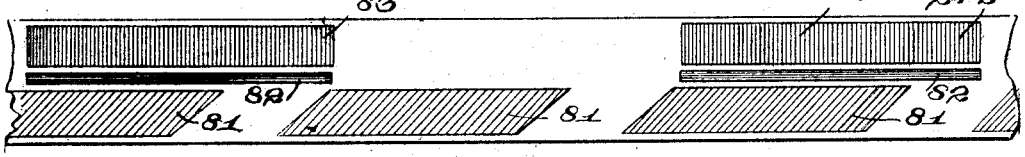
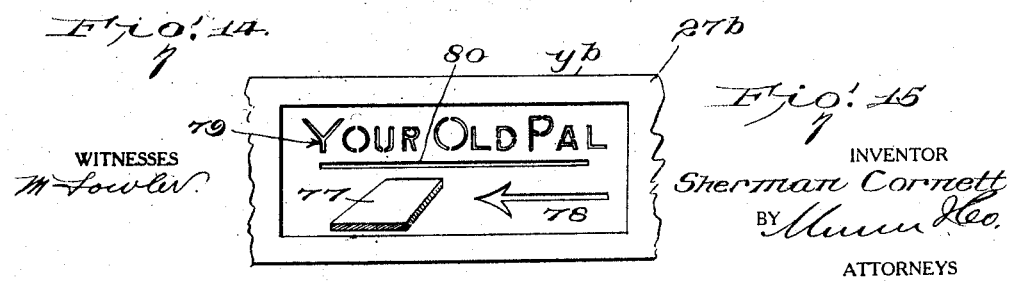

Patented June 28, 1927.

1,634,174

UNITED STATES PATENT OFFICE.

SHERMAN CORNETT, OF REECE, KANSAS.

DISPLAY SIGN AND METHOD OF PRODUCING THE SAME.

Application filed April 20, 1926. Serial No. 103,322.

My invention relates to improvements in display signs, and it consists in the combinations, constructions and arrangements herein described and claimed.

An object of the invention is the provision of an apparatus which comprises mechanical means for producing a display sign having elements which seem to move bodily as though animated or to intermittently appear to view and then disappear.

A further object of the invention is the provision of an apparatus which affords facilities for producing various display signs, pictures, and the like, all having the effect of including moving parts and respectively varying from one another in appearance or color effects according to changes in relatively few readily replaceable parts of the apparatus.

A still further object of the invention is the provision of a novel method of producing display signs or pictures having the effect of movement or animation either in whole or in part.

Other objects and advantages of the invention will be apparent from the following description, considered in conjunction with the accompanying drawings, in which Figure 1 is a perspective view of apparatus for producing a display sign or picture according to the invention, one form of picture being shown, Figure 2 is a horizontal section through the upper part of the apparatus shown in Figure 1, Figure 3 is a vertical section through the apparatus, the view being taken substantially along the line 3—3 of Figure 2, Figures 4 and 5 are perspective views of supporting elements which are used in the apparatus, Figure 6 is a perspective view of a removable shield or front panel of the case of the apparatus shown in Fig. 1, Figure 7 is a fragmentary view of portions of the elements shown in Figures 4 and 5, together with a spool in place on a spindle of the structure shown in Figure 5, the spool being shown in vertical section, and showing the end portion of a screen strip which is attached to the spool, Figure 8 shows a side elevation of the spool and the holding means therefor, the latter being shown in section as taken along the line 8—8 of Figure 2, Figure 9 is a perspective view of a securing device which is used in the apparatus, Figure 10 is a fragmentary front elevation of a film which is used with the apparatus shown in Figures 1 to 3 inclusive in the production of the picture exhibited in Figure 1, Figure 11 is a fragmentary front elevation of a screen strip which is used in conjunction with the film shown in Figure 10 to produce the picture exhibited in Fig. 1, Figures 12 and 13 respectively are views similar to Figures 10 and 11, showing cooperative film and screen strips for use with the apparatus shown in Figures 1 to 3 inclusive in the production of a second form of display sign or picture, and Figures 14 and 15 respectively are views similar to Figures 10 and 11, showing still other cooperative film and screen strips for producing a third form of display sign or picture.

Apparatus for carrying out the invention includes a supporting base 1 which may be the bottom of a cabinet case which may also include a pair of vertical side walls 2, a rear wall 3, and a top 4, the case thus being open at the front. A pair of supporting spindles 5 are mounted on the base 1 at equal distances from the front edge of the base and relatively adjacent to the front edge of the base, respective spindles 5 being vertical and being disposed adjacent to opposite side walls 2 of the case. The spindles 5 thus are in line with each other transversely of the base 1. These spindles 5 may be stationary on the base and each supports a freely rotatable spool 6 which is adapted to turn about the axis of the associated spindle. A third spindle 7 is movable bodily on the base and may have a horizontally flanged supporting portion 8 which, as shown to advantage in Figure 8, is slidable on the base underneath the upwardly offset inner edge portions 9 of a pair of parallel guiding and retaining members 10 which are secured by screws 11 or like fastening devices to the base. The guiding and retaining members 10 are disposed on the base relatively adjacent to one rear corner of the base and preferably so that the guiding and retaining members can extend in a direction oblique to the direction of length of the side walls of the case. The supporting portion 8 of the spindle 7 may be locked to the base 1 in adjusted position along the guiding and retaining members 10 by means of a set screw 12 which has a shank adapted for movement along a longitudinal slot 13 in one of the guiding and retaining members 10, the shank of said screw being in engagement with a vertical opening in the supporting portion of the spindle 7. The spindle 7 supports a rotatable vertical spool 15 which is similar to the spools 6. A third spindle 16 may be secured on the base 1 intermediate the side walls 2 of the base and adjacent the rear wall 3 of the case. The spindle 16 has a driving spool 17 rotatably supported thereon. A pulley 18 is disposed rotatably on the upper end portion of the spindle 7 and is secured, as by means of the key 19, to the spool 17 so that the pulley and the spool 17 will rotate in unison. A torque may be imparted to the pulley 18 in any suitable known manner, as by means of a belt connection 20 between the pulley 18 and a pulley 21 on the drive shaft 22 of a motor 23 which is secured on the base 1 adjacent to the second rear corner of the base. An endless strip of film 24 is trained about the pulleys 6, 15, 17, and a plurality of guide pulleys 25 which are rotatably supported on vertical spindles 26. The spindles 26 are mounted on the base 1 so that the stretch of the film strip 24 that extends from the driving pulley 17 to the left hand supporting pulley 6 will pass about the guide pulleys 25 in turn, certain of the spindles 26 being located relatively adjacent to the left hand side wall 2 of the case and the remaining spindles 26 being located adjacent to the right hand side wall 2 of the case, as clearly shown in Figure 2. The movable pulley 15 is adjusted on the base 1 so that the film strip 24 will be kept taut and therefore the stretch on the film strip which extends from the left hand pulley 6 to the right hand pulley 6 will lie in a vertical plane which extends transversely of the case adjacent to the front end of the latter. The stretch of film strip that extends between the pulleys 6 is indicated at $x$ and it will be observed that this stretch of the film strip lies in a plane which is tangent to the bodies of the pulleys 6 at the front of the pulleys 6.

The invention also contemplates the provision of a screen strip 27 which is supported by a pair of transversely spaced vertical spools 28 on the front portion of the base 1 so that a stretch $y$ of the strip 27 will extend transversely of the base between the spools 28 directly in front of the stretch $x$ of the film strip 24 close to if not in actual contact with the stretch $x$ of the film strip. The spools 28 are rotatably supported on vertical spindles 29 which are upstanding from the opposite end portions 30 of a flat cross supporting bar 31 which is of less length than the width of the front portion of the base 1 and preferably is slightly shorter than the distance between the axes of the spindles 5. The end portions 30 of the cross bar 31 have integral brackets 32 which include horizontal members 33 that are located in spaced relation to the plane of the cross bar 31 close to the spindle 29, the inner ends of the horizontal members 33 of the brackets 32 being free. Each spool 28 fits on the associated spindle 29 so that a flange 34 on the spool at the lower end of the spool extends underneath the horizontal member 33 of the adjacent bracket 32. Each horizontal member 33 is provided with a vertical opening with which a clamping screw 35 is in threaded engagement. These clamping screws 35 are above the portions of the flanges 34 of the spools 28 which extend underneath the horizontal arms 33 of the bracket 32 and it therefore is obvious that the clamping screws 35 can be manipulated to clamp the flanges 34 of the spools 28 firmly to the supporting portions 30 of the clamping bar 31. When the clamping screws 35 have been loosened, the spools 28 may be turned about the axes of the spindle 29 to adjust the screen strip 27 on the spools 28. The screen strip 27 is of considerably greater length than the straight line distance between the spools 28 so that said stretch $y$ will remain desirably taut when the spools 28 have been turned in opposite directions as required to wind the opposite end portions of the screen strip 27 on the spools 28.

The supporting cross bar 31 is movable bodily forward and rearwardly on the base 1 to vary the distance between the stretch $y$ of the screen strip and the stretch $x$ of the film strip. To prevent accidental displacement of the cross bar 31 and the parts which are carried thereby from adjusted position on the base 1, the invention provides securing means which includes a pair of rearwardly extending integral arms 36 on the cross bar 31, a pair of fastening blocks 37 which are secured by screws 38 to the base rearwardly of the stretch $x$ of the film strip and which have fore-and-aft horizontal guide opening 39 through which the arms 36 extend slidably, and clamping screws 40 which are in threaded engagement with vertical openings in the blocks 37 and which can be tightened against the rearwardly extending arms 36 to secure the arms 36 firmly to the blocks 37. The clamping screws 40 preferably have laterally turned upper end portions 41 which can be conveniently actuated by the fingers of a hand when it is desired to tighten or loosen the screws 40.

The spindles 29 may have the extreme upper end portions thereof reduced as indicated at 42 to extend through vertical openings 43 in the end portions of a second cross supporting bar 44 and to produce upwardly facing horizontal shoulders 45 for engaging with the end portions of the bar 44 to limit the downward movement of the end portions of the bar 44 on the spindles 29 and to support the end portions of the bar 44.

The front panel of the aforesaid cabinet case of the apparatus includes a substantially rectangular middle portion 46 which has a height slightly less than the distance between the base 1 and the top wall 4 of the cabinet case and a length slightly less than the distance between the spools 28 on the spindles 29. This middle portion 46 of the front panel of the case may be termed a frame since it has a rectangular opening 47 of relatively great area formed therein. The height of this opening 47 is approximately equal to the width of the screen strip 27 and the width of the opening 47 is but slightly less than the width of the middle portion 46 of the front panel of the case. The front panel of the case is removably supported in the front part of the case by means of rearwardly extending hook members 48 on the middle portion 46 of the front panel of the case above the opening 47, these hook members 48 engaging over the cross bar 44 on the spindle 29 and supporting the middle portion 46 of the front panel of the case so that the lower edge portion thereof will bear against the lower cross bar 31 close to the base 1 of the case if not in actual contact with the base 1. The front panel of the case also includes a pair of end portions 49 which may be joined integrally at their inner ends with the middle portion 46 at opposite sides of the opening 47. The end portions 49 of the front panel of the case are in sliding contact at their outer ends with the inner faces of the side walls 2 of the cabinet case and are curved convexly in a forward direction transversely thereof as clearly shown in Figures 1, 2 and 6 so as to extend at the front of the spools 28 in spaced relation to the spools 28.

The stretch y of the screen strip 27 extends transversely of the case rearwardly of the opening 47 in the panel of the case and the greater portion of this stretch y of the screen strip will be visible through the opening 47 which thus may be termed a window and which obviously might have a transparent pane mounted therein if desired. However, the spools 28 and the hereinbefore described means for supporting the spools 28 on the base will be hidden from view by the end portions 49 of the front panel of the case. Of course, the parts of the device which are described as being located within the case rearwardly of the stretch x of the film strip will be hidden from view and the interest of an observer who is viewing the case from the front will be centered therefore on the portion of the stretch y of the screen strip that is visible through the opening 47. The portion of the stretch y of the screen strip that is visible through the opening 47 cooperates with the portion of the strip x of the film strip that moves across the stretch y of the screen strip at the rear of the latter to produce a sign or picture, elements of which appear to be animated. The character and appearance of the display sign or picture will vary with changes in the cooperative features of the film strips and the screen strips which are used in the device. The stretch y of the screen strip shown in Figs. 1 and 11 has a white field with the picture of an elephant produced thereon at 50 in any desirable color, as for example, jet black. At one side of the element 50 is a spring board 51 and its support 52, both being produced on the white field of the screen strip in any desired color. A landing map 53 is produced on the white field of the screen strip at the opposite side of the elephant. Cut-outs indicated at 54 to 62 inclusive are formed in the stretch y of the screen strip. Each of these cut-outs is formed to resemble a miniature human being and the respective cut-outs are so located as to depict a plurality of different positions which would be assumed by a human being who has run from a position at the left of an elephant onto a spring board and then has sprung from the spring board over the elephant and has landed on a mat at the opposite side of the elephant and finally has walked from the mat to a position at the right of the mat and stands in the position of one who expects applause for his feat. The associated film strip 24 has a white field as indicated at 63 on which colored areas 64 are produced at places spaced longitudinally of the film strip, the distance between adjacent colored areas 64 preferably being approximately the same as the distance between the most remote portions of the cut-outs at the opposite ends of the series of cut-outs on the screen strip. These colored areas 64 preferably extend on the outer face of the film strip from the upper edge to the lower edge of the film strip and each colored area 64 has a width slightly greater than the greatest transverse dimension of any one of the cut-outs in the screen strip. The colored areas preferably are jet black.

From the foregoing description of the various parts of the device, the operation thereof may be readily understood. The stretch y of the screen strip remains stationary. The film strip is moved in the direction of its length at the back of the stretch y of the screen strip. When the white field 63 of the film strip is back of the cut-outs 54 to 62 inclusive of the screen strip, these cut-outs will be practically invisible. However, the figure that is represented by each of the cut-outs 54 to 62 inclusive will become visible when a colored area 64 of the film strip moves at the back of the screen strip in position to cover that cut-out and the respective cut-outs 54 to 62 inclusive thus will define figures which will become visible in sequence as a colored area of the screen strip is moved at the rear of the screen strip from a position back of the cut-out 54 to a position back of the cut-outs 62 and the complete picture that is produced thus will appear to include a moving figure which seems to run from a position at the left hand side of the picture onto the spring board 51 and then to jump over the elephant 50 at the left on the mat 53 and finally to assume the position indicated by the cut-out 62, after which the figure that is outlined by the cut-out 62 appears to fade from view and the picture then appears to comprise only the parts that are produced on the screen strip until another colored area of the film strip moves back of the stretch $y$ of the screen strip across the backs of the cut-outs 54 to 62 inclusive. A picture that is pleasing to the eye and will attract attention thus is produced and it is obvious that any advertising matter or other indicia may be produced on the screen strip in association with the picture.

The screen strip shown partially in Figure 13 is designated $27^a$ and includes a stretch $y^a$ similar to the stretch $y$ of the screen strip 27. This stretch $y^a$ of the strip $27^a$ has a vertical series of spaced circular openings 65 to 68 inclusive formed therein and has produced thereon in suitable colors the likeness 69 of a child who is shown with one hand, indicated at 70, at the top of the upper opening 68. Advertising matter, such as the words "Health tonic all stores" are produced on the screen strip $27^a$ adjacent to the series of openings 65 to 68 inclusive. The film strip that is adapted for use with the screen strip $27^a$ is indicated at $24^a$ and has oppositely inclined series of colored areas 71 to 74 inclusive and 74, 75, 76 and 71, respectively, produced thereon.

The fields of the film strip and the screen strip are white. The colored areas 71 are located at the level of the lower opening 65 in the screen strip. The colored areas 72 and 76 are located at the level of the opening 66, the colored areas 73 and 75 are located at the level of the opening 67 and the colored areas 74 are located at the level of the upper opening 68. Each of these colored areas is of greater area than the corresponding opening in the screen strip and therefore each colored area of the film strip will completely cover the corresponding opening in the screen strip when such colored area is directly back of the corresponding opening in the screen strip. In consequence, the picture that will be produced will appear to include a ball that bounces vertically under the hand 70 of the child from the ground to the hand of the child and back again. The screen strip shown partially in Figure 15 as indicated at $27^b$ and has a stretch $y^b$ on which has produced at 77 a suitably colored representation of a rectangular strip or "plug" of tobacco. A cut-out 78 in the form of an arrow is formed in the strip $27^b$ at the right hand side of the Figure 77 with the arrow pointing toward the figure 77. Openings are cut in the strip 27 above the figure 77 and the cut-out 78 to define the words "Your old pal" as indicated generally at 79 and to define a horizontal score line 80 underneath these words. The field of the strip $27^b$ is white. A film strip $24^b$ is partially shown in Figure 14 and is adapted for use with the screen strip $27^b$. The field of the film strip $27^b$ also is white. This film strip $24^b$ has a series of horizontally spaced colored areas 81 in positions to cover the cut-out 78 successively as the film strip moves at the back of the screen strip. The areas 81 preferably are colored brown to conform to the color of the figure 77 on the screen strip. The film strip $24^b$ also has a series of horizontally spaced areas 82 which preferably are colored blue and are located on the film strip in positions to cover the openings 80 successively and so that the opening or cut-out 80 will be colored by one of the colored areas 22 at the same time the cut-out 78 is covered by one of the colored areas 81. The film strip $24^b$ has a third series of horizontally spaced areas, indicated at 83, which may be colored red. The colored areas 83 are located in positions to cover the openings that define the words "Your old pal." The arrangement is such that one of the colored areas 83 will be directly back of the openings which define the words "Your old pal" at the same time one of the colored areas 82 is back of the cut-out 80 and one of the colored areas 81 is back of the cut-out 89. During the intervals between the times when the openings in the screen film are covered by colored areas of the film strip, the openings in the screen strip will be practically invisible and attention thus will be directed to the representation 77 on the screen strip when the colored areas of the film strip move to and from positions at the backs of the openings in the screen strip.

It is obvious that display signs and pictures relating to any given subject and containing any desirable arrangement of colors or combination of colors may be produced by making use of screen strips having suitable openings formed therein and desirable indicia or representations produced thereon in association with cooperating film strips having suitably colored areas for covering the openings in the screen strips as the film strip moves in juxtaposed relation to a stretch of the screen strip at the rear of the latter. A screen strip having sufficient length to comprise a plurality of the stretches between the rollers 28 may be provided, the excess portions of the screen strip being wound upon the rollers when a given portion of the screen strip extends between the rollers. The screen strip then may be adjusted longitudinally on the rollers to present different portions thereof to view through the opening 47 as desired and these different portions of the screen strip may have different arrangements of openings and indicia or other matter produced thereon so that the one screen strip may be adapted for use at different times with different film strips.

Obviously, the invention is susceptible of embodiment in forms other than those which are exhibited in the accompanying drawings, and I therefore consider as my own all such modifications and adaptations thereof as fairly fall within the scope of the appended claims.

The device may be used to display signs, pictures or the like in show windows, or in any other location indoors, or on roofs, billboards or at other locations out of doors.

I claim:—

1. Apparatus of the character described comprising a base, a pair of transversely spaced vertical spools rotatably supported on said base, releasable means for preventing rotation of said spools, a screen strip extending between said spools and partially wound on said spools, said screen strip having openings formed therein, a pair of other vertical spools spaced transversely of the base, and a film strip trained about said last named spools and having a stretch extending parallel to said screen strip close to the inner face of the latter, said film strip having a plurality of longitudinally spaced colored areas produced thereon each adapted to cover an opening in said screen strip as said film strip moves on said second named spools close to said screen strip.

2. In a display apparatus of the character described, a base, a pair of transversely spaced vertical spools rotatably supported on the base adjacent to one edge thereof, a driving spool rotatably supported on the base, a rotatable vertical spool adjustably supported on said base between said driving spool and one of said first named spools, a plurality of vertical guide spools supported on said base between said driving spool and the second of said first named spools, an endless film strip trained about all of said spools, whereby a stretch of said film strip will extend transversely of said base, a pair of transversely spaced other spools rotatably and adjustably supported on said base between said first named spools and said one edge of said base, a screen strip extending between said last named spools parallel to and close to said stretch of the film strip, said screen strip having one or more openings produced therein, said film strip having spaced colored areas produced thereon adapted to cover said openings in the film strip as said film strip moves along said screen strip.

3. In a display apparatus of the character described, a base, a pair of transversely spaced vertical spools rotatably supported on the base adjacent to one edge thereof, a driving spool rotatably supported on the base, a rotatable vertical spool adjustably supported on said base between said driving spool and one of said first named spools, a plurality of vertical guide spools supported on said base between said driving spool and the second of said first named spools, an endless film strip trained about all of said spools, whereby a stretch of said film strip will extend transversely of said base, a pair of transversely spaced other spools rotatably and adjustably supported on said base between said first named spools and said one edge of said base, a screen strip extending between said last named spools parallel to and close to said stretch of the film strip, said screen strip having one or more openings produced thereon, said film strip having spaced colored areas produced thereon adapted to cover said openings in the film strip as said film strip moves along said screen strip, means for imparting a torque to said driving spool, said adjustable film strip supporting spool being capable of movement on said base to cooperate with the remaining film strip supporting spools to maintain said film strip taut.

4. Apparatus for producing display matter having the effect of animation, comprising a case comprising a base, a pair of spaced side walls and a top wall, said case being open at its front, an endless film strip, means for movably supporting said film strip within said case so that a stretch of said film strip will extend transversely of the case adjacent to the front of the latter, a pair of transversely disposed rotatable vertical spools, a supporting cross bar having upstanding spindles on their opposite end portions on which said spools are mounted, rearwardly extending attaching arms for said cross bar slidable on said base, a screen strip extending between said spools, and means secured to said base for clamping said attaching arms of said cross bar to said base so that said screen strip will extend at the front of said stretch of the film strip close to the latter, said screen strip having an opening formed therein, said film strip having spaced colored areas adapted to be moved in sequence past said opening in the screen strip as said film strip moves, each of said colored areas being adapted to cover said opening in the screen strip when in register with the opening in the screen strip.

5. In a sign apparatus of the character described, a substantially flat base, a cross bar slidable on said base and having a pair of inwardly turned lateral attaching arms, a pair of blocks secured to said base and having guide slots through which said attaching arms slidably extend, clamping means carried by said blocks for engaging with said attaching arms for locking said attaching arms to said blocks, vertical spindles on the end portions of said cross bar, spools disposed on said spindles and having flanges at their lower ends, clamping means carried by said end portions of the cross bar engaging with said flanges of the spools to lock said spools to said cross bar, a screen strip extending between said spools, and means engageable with the upper end portions of said spindles for supporting a removable front panel on said base in position to obstruct view of said spools from the front of the base, said front panel having a window opening to disclose said screen strip.

6. In a sign apparatus of the character described, a substantially flat base, a cross bar slidable on said base and having a pair of inwardly turned lateral attaching arms, a pair of blocks secured to said base and having guide slots through which said attaching arms slidably extend, clamping means carried by said blocks for engaging with said attaching arms for locking said attaching arms to said base, vertical spindles on the end portions of said cross bar, spools disposed on said spindles and having flanges at their lower ends, clamping means carried by said end portions of the cross bar engaging with said flanges of the spools to lock said spools to said cross bar, a screen strip extending between said spools, a pair of side walls on said base at opposite sides of said spools, a top wall supported by said side walls, and a removable front panel in contact at its opposite ends with the inner faces of said side walls and movable rearwardly in said case between said base and said top member, said front panel having a substantially straight middle portion provided at its upper edge with rearwardly extending hook members and having rearwardly curved end portions spaced from said spools, said spindles having reduced upper end portions, an upper cross bar supported removably on the reduced upper end portions of said spindles, said hook members of said front panel being adapted to be hooked over said upper cross bar to support said front panel vertically close to said screen strip, said middle portion of the front panel having a relatively large opening through which said screen strip may be viewed from the front of the base.

SHERMAN CORNETT.